United States Patent [19]

Ryang

[11] Patent Number: 4,522,985
[45] Date of Patent: Jun. 11, 1985

[54] HEAT CURABLE SILICONE-POLYIMIDE BLOCK COPOLYMERS

[75] Inventor: Hong-Son Ryang, Camarillo, Calif.

[73] Assignee: General Electric Company, Schenectady, N.Y.

[21] Appl. No.: 604,569

[22] Filed: Apr. 27, 1984

[51] Int. Cl.³ .............................................. C08G 69/48
[52] U.S. Cl. .................................... 525/431; 525/474; 525/478; 525/479; 528/24; 528/26
[58] Field of Search .............. 525/431, 479, 474, 478; 528/26, 24

[56] References Cited

U.S. PATENT DOCUMENTS

| | | | |
|---|---|---|---|
| 4,381,396 | 4/1983 | Ryang | 549/237 |
| 4,404,350 | 9/1983 | Ryang | 528/26 |
| 4,472,565 | 9/1984 | Ryang | 528/26 |

OTHER PUBLICATIONS

An Introduction to the Chemistry of the Silicones, E. G. Rochow, Second Edition, John Wiley & Sons, Inc., NY (1951) pp. 94–97.

Primary Examiner—Melvyn I. Marquis
Attorney, Agent, or Firm—William A. Teoli; James C. Davis, Jr.; James Magee, Jr.

[57] ABSTRACT

Heat curable siloxane-imide block copolymer compositions are provided based on the use of an organic peroxide and a siloxane imide block copolymer containing norbornane siloxy imide functional groups. A hydrosilyl terminated norbornane oligomide is employed with polydiorganosiloxane having olefinic unsaturation, or silicon hydride functional groups to make siloxane-imide block copolymer which can be further blended with additional polydiorganosiloxane along with effective amounts of free radical initiators. The resulting silicon elastomers have improved toughness compared to conventional heat cured polydiorganosiloxanes.

7 Claims, No Drawings

HEAT CURABLE SILICONE-POLYIMIDE BLOCK COPOLYMERS

CROSS REFERENCE TO RELATED APPLICATIONS

Reference is made to my copending application Ser. No. 507,182, filed June 23, 1983, now abandoned, for Silicon Functionalized Norbornane Carboxyimide and Methods for Making, and Ser. No. 604,570, filed Apr. 22, 1984, for Siloxane Imide Bisphenols and Block Copolymers Made Therefrom, filed concurrently herewith, where all of the aforementioned applications are assigned to the same assignee as the present invention and incorporated herein by reference.

BACKGROUND OF THE INVENTION

The present invention relates to heat curable siloxane-imide block copolymer compositions and to the tough silicon elastomers obtained therefrom.

Prior to the present invention, one method for improving the toughness of elastomeric polydiorganosiloxanes was the introduction of silphenylene units into the polymer backbone as shown by Sveda, U.S. Pat. No. 2,652,000. Another procedure for improving the toughness of silicon elastomers is by employing either a two component blend, or three component blend of a vinyl containing organopolysiloxane gum having minor amounts of chemically combined siloxy units with at least one vinyl radical attached to silicon, as shown by Bobear U.S. Pat. No. 3,660,345.

STATEMENT OF THE INVENTION

The present invention is based on the discovery that a silicone elastomer having improved toughness can be made by heating a heat curable composition comprising
(A) an effective amount of an organic peroxide, and
(B) a polydiorganosiloxane-polyimide block copolymer comprising by weight from 1 to 99% of polyimide blocks of the formula,

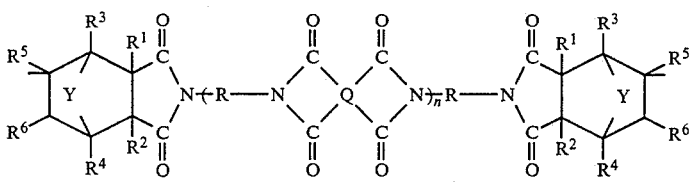

chemically combined with from 99 to 1% of polydiorganosiloxane blocks of the formula,

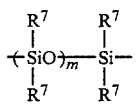

where R is a divalent $C_{(2-20)}$ organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms (c) $C_{(2-13)}$ organo terminated polydiorganosiloxane, and (d) divalent radicals included by the formula,

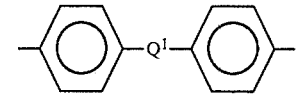

$Q^1$ is a member selected from the class consisting of

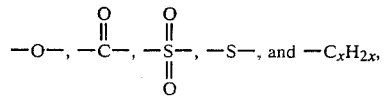

x is a whole number from 1 to 5 inclusive, Q of formula (1) is a tetravalent radical selected from

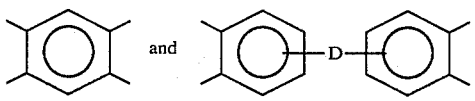

where D is a member selected from

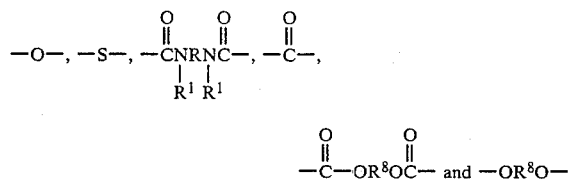

$R^8$ is a divalent radical selected from

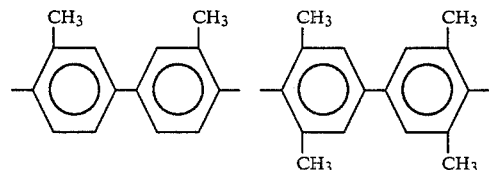

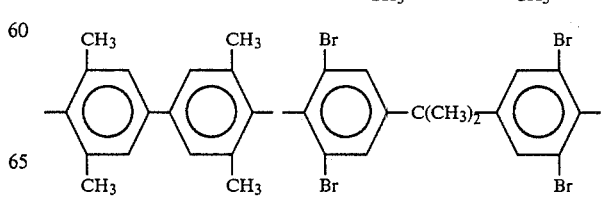

and divalent organic radicals of the general formula,

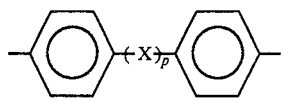

p is 0 or 1, X is a member selected from the class consisting of divalent radicals of the formula,

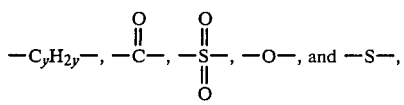

y is an integer from 1 to 5, $R^1$–$R^6$ are selected from hydrogen and $C_{(1-8)}$ alkyl radicals and $R^7$ is the same or different $C_{(1-13)}$ monovalent hydrocarbon radical and substituted $C_{(1-13)}$ monovalent hydrocarbon radical, Y is a divalent radical selected from —O— and —C($R^1$)$_2$, n is a whole number equal to 0–200 inclusive and m is an integer equal to 1–2000 inclusive. $R^7$ in formula (2) is preferably a mixture of methyl and vinyl radicals, where there can be from 0.05 to 2 mole percent of vinyl, based on the total moles of methyl and vinyl.

One method of making the heat curable silicone polyimide block copolymers of the present invention is by initially making a silicon hydride terminated polyimide. Reaction can be effected between an organic diamine, a norbornene anhydride and organic dianhydride, in accordance with the following equation

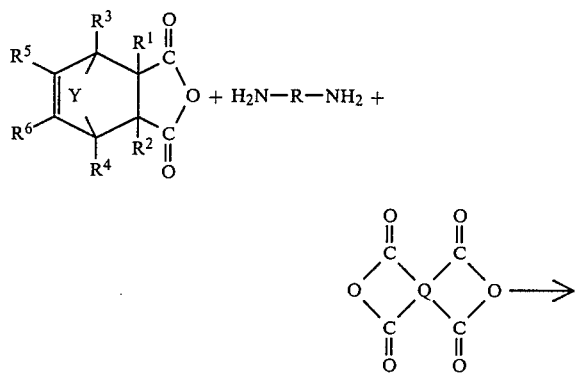

to produce a norbornene terminated polyimide having the formula,

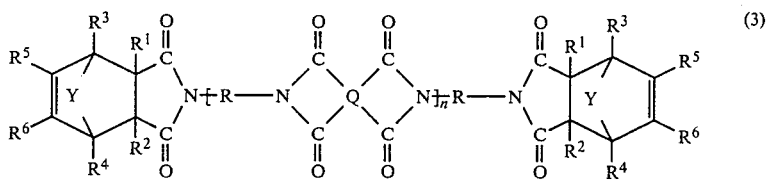

where Q, R, $R^1$–$R^6$, n and Y are as previously defined.

The norbornene terminated polyimide can thereafter be hydrosilylated with a silicon hydride having the formula,

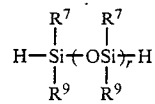

to produce a silicon hydride terminated polyimide, where r is a whole number equal to 0 to 2000 inclusive, $R^9$ is selected from hydrogen and $R^7$.

The norbornene terminated polyimide of formula (3) also can be reacted with a silicon hydride of the formula,

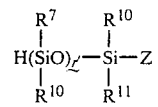

shown in my copending application Ser. No. 507,182, filed June 23, 1983, now abandoned, where Z is selected from $C_{(1-8)}$ alkoxy, amine, acyloxy or halogen and $R^{10}$ and $R^{11}$ are selected from Z and $R^7$, and R' is 0 or 1 and $R^7$ is as previously defined.

The silicon hydride terminated polyimide can be reacted with a vinyl terminated polydiorganosiloxane, or where the polyimide is terminated with a silicon hydride or ≡SiZ group, it can be reacted with a silanol terminated polydiorganosiloxane in the presence of an effective amount of a catalyst such as a condensation or addition catalyst to produce the silicon-polyimide block copolymers comprising chemically combined units of formulas (1) and (2).

In addition to the silicon-polyimide block copolymers comprising chemically combined units of formulas (1) and (2), there also can be used in the heat curable compositions of the present invention, silicon-polyimide block copolymers shown in U.S. Pat. No. 4,404,350, incorporated herein by reference. An effective amount of a suitable organic anhydride also can be used to produce the heat curable silicone-polyimide block copolymer compositions of the present invention. For example, an aryl diamine and a siloxane dianhydride as shown by formula (6) below can be optionally reacted with an organic dianhydride. Reaction of the various ingredients can be achieved in a suitable organic solvent such as dimethylformamide to produce a silicon-polyamide acid block copolymer which thereafter can be converted to the polyimide state.

Radicals included within $R^1$–$R^6$ of formulas (1), (3) and (4) are, for example, hydrogen, methyl, ethyl, propyl, butyl, etc. Radicals included within $R^7$ are, for example, aryl radicals and halogenated aryl radicals, for example, phenyl, chlorophenyl, tolyl, xylyl, biphenyl, naphthyl, etc.; alkenyl radicals, for example, vinyl, allyl, cyclohexenyl, etc.; $C_{(1-8)}$ alkyl radicals and halogenated alkyl, for example, methyl, ethyl, propyl, butyl, octyl, etc.

Some of the organic dianhydrides which can be used in the practice of the present invention to produce the norbornene terminated polyimide of formula (3) along with norbornene anhydride chain-terminating monomers are, for example, benzophenone dianhydride, pyromellitic dianhydride, 2,2-bis[4-(3,4-dicarboxyphenoxy)phenyl]propane dianhydride, 2,2-bis[4-(2,3-dicarboxyphenoxy)phenyl]propane dianhydride, 4-(2,3-dicarboxyphenoxy)-4′-(3,4-dicarboxyphenoxy)diphenyl-2,2-propane dianhydride, and bisnorbornane siloxane dianhydride of the formula,

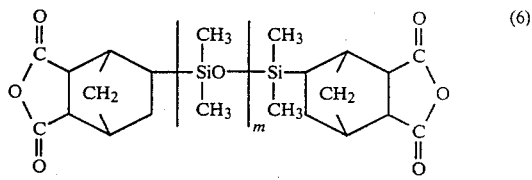

and mixtures thereof, where m is as previously defined.

Organic diamines which can be used to make the polyimide blocks of the silanol terminated polydiorganosiloxane-polyimide copolymers are, for example,
o-phenylenediamine;
m-phenylenediamine;
p-phenylenediamine;
4,4′-diaminodiphenylpropane;
4,4′-diaminodiphenylmethane (commonly named 4,4′-methylenedianiline);
4,4′-diaminodiphenyl sulfide (commonly named 4,4′-thiodianiline);
4,4-diaminodiphenyl ether (commonly named 4,4′-oxydianiline);
1,5-diaminonaphthalene;
3,3′-dimethylbenzidine;
3,3′-dimethoxybenzidine;
2,4-bis(β-amino-t-butyl)toluene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine
heptamethylenediamine;
nonamethylenediamine;
decamethylenediamine;
bis(3-aminopropyl)tetramethyldisiloxane;
bis(4-aminobutyl)tetramethyldisiloxane;
and mixtures of such diamines.

Some of the silicon hydrides of formula (4) which can be employed in the practice of the present invention to introduce silicon hydride functional groups into the polyimide having aliphatically unsaturated norbornene groups are, for example, diorganosiloxanes, for example, dimethylsilane, diphenylsilane, 1,1,3,3-tetramethyldisiloxane.

Silanol terminated polydiorganosiloxanes which can be used in combination with the silicon hydride terminated, or $\equiv$SiZ terminated polyimide to produce some of the polydiorganosiloxane-polyimide copolymers preferably have a viscosity in the range of from about 10 to 400,000 centipoise and preferably from about 1000 to about 250,000 centipoise when measured at about 25° C. These silanol terminated fluids can be made by treating a higher molecular weight organopolysiloxane, for example, a dimethylpolysiloxane with water in the presence of a mineral acid or base catalyst. Hydrolysis of diorganohalosilane, for example dimethyldichlorosilane, diphenyldichlorosilane, methylvinyldichlorosilane, methylfluoropropyldichlorosilane, methylcyanoethyldichlorosilane, or mixtures thereof can produce low molecular weight polymer. Equilibration thereafter can provide for higher molecular weight organopolysiloxane. Organopolysiloxane also can be treated with steam under pressure or other procedures described in U.S. Pat. No. 2,607,792 and U.K. Pat. No. 835,790.

Some of the condensation catalysts or addition catalysts which can be used in combination with the silicon hydride terminated polyimide with the silanol or vinyl terminated polydiorganosiloxane to produce the polydiorganosiloxane-polyimide copolymer of the present invention are, for example, platinum complexes of unsaturated siloxanes, as shown by Karstedt U.S. Pat. No. 3,775,442, Ashby U.S. Pat. Nos. 3,159,601, and 3,159,662 and Lamoreaux U.S. Pat. No. 3,220,972, assigned to the same assignee as the present invention. An effective amount of a platinum catalyst is about $10^{-4}$ to 0.1% by weight of platinum, based on the weight of curable hydrosilylation mixture.

Organic peroxides which can be used to effect the heat cure of the polydiorganosiloxane-polyimide copolymers of the present invention can be utilized at from about 1.0 to 8 parts by weight per 100 parts of polydiorganosiloxane-polyimide copolymer and preferably from 1 to 4 parts. Some of these organic peroxides are, for example, benzoyl peroxide, dicumyl peroxide, 2,5-dimethyl, 2,5-ditertiarybutylperoxyhexane, tertiary butylperbenzoate, bis(2,4-dichlorobenzoyl)peroxide, ditertiarybutyl peroxide, tertiarybutylperoxyisopropyl carbonate, etc.

Various fillers and pigments can be incorporated into the heat curable siloxane compositions of the present invention. For example, there can be used, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of polydiorganosiloxane-polyimide copolymers can be employed. In such applications, the filler can consist of a major amount of extending material, such as ground quartz, polyvinyl chloride, or mixtures thereof, peferably having an average particle size in the range of from about 1 to 10 microns.

The exact amount of filler, therefore, will depend upon such factors as the applications for which the organopolysiloxane composition is intended, the type of filler utilized (that is, the density of the filler and its particle size). Preferably, a proportion of from 5 to 300 parts of filler, which can include up to about 35 parts of reinforcing filler, such as fumed silica filler, per 100 parts of silanol terminated organopolysiloxane is utilized.

The synthesis of the norbornene terminated polyimide used in making the silicon hydride terminated polyimide of formula (3) can be accomplished by conventional procedures, utilizing substantially equal molar amounts of the organic diamine, dianhydride, along with an effective amount of the chain-stopping norbornene anhydride which can be utilized in an amount sufficient to produce the polyimide at a desired molecular weight. During the polymerization of the norbornene terminated polyimide, there can be utilized organic solvents, for example, orthodichlorobenzene, and can be used are, for example, chlorobenzene and orthodichlorobenzene. Hydrosilylation is preferably conducted under substantially anhydrous conditions at a temperature in the range of from 15° C. to 90° C.

In order that hose skilled in the art will be better able to practice the invention, the following examples are given by way of illustration and not by way of limitation. All parts are by weight.

EXAMPLE 1

There was added a mixture of 13.68 grams of 5-norbornene-2,2-dicarboxylic anhydride and 43.33 grams of 2,2-bis[4-(3,4-dicarboxyphenoxy)phenyl]propane dianhydride over a period of 10 minutes under nitrogen to a solution of 13.51 grams of meta-phenylene diamine and 100 ml o-dichlorobenzene. The resulting solution was heated to reflux for 2 hours while water was continuously removed azeotropically. The resulting solution was poured into 500 ml of methanol and stirred vigorously. A product was precipitated which was filtered, washed with methanol and dried. Based on method of preparation, the product had the following formula,

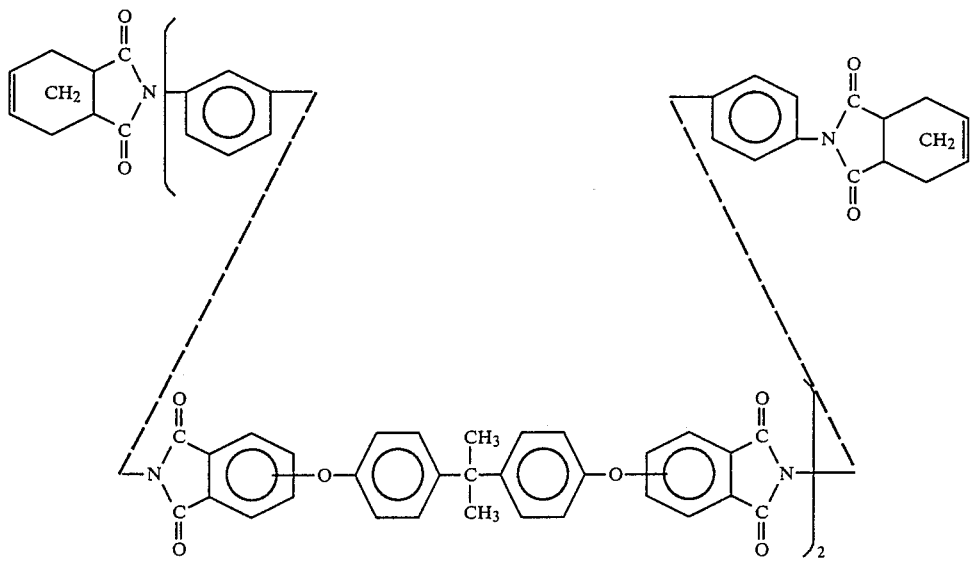

temperature in the range of from 150° C. to 200° C. can be employed. Reaction can be conducted in an inert atmosphere, for example, under nitrogen to minimize undesirable side reactions. Reaction times can vary from 30 minutes or less to 3 hours, depending upon the nature of the reactants, the molecular weight of the polyimide desired, etc.

The silicon hydride or ≡SiZ terminated polyimide can be synthesized by effecting reaction between the norbornene terminated polyimide of formula (3) and an appropriate silicon hydride of formulas (4) or (5), such as a dihydrogen silane, a dihydrogen disiloxane, in the presence of an effective amount of a platinum catalyst. An effective amount of platinum catalyst is from about $10^{-6}$ parts to $10^{-3}$ parts of platinum, per part of the hydrosilylation mixture consisting of the norbornene terminated polyimide, silicon hydride and an inert organic solvent which can be utilized in an amount sufficient to produce a mixture having from 10% to 50% by weight of solids. Suitable inert organic solvents which There was obtained 65.8 grams of the above norbornene terminated polyetherimide, which represented a yield of 97%.

There was added under a nitrogen atmosphere, 5 drops of a 5% platinum catalyst prepared in accordance with Karstedt U.S. Pat. No. 3,775,442 to a mixture of 22.0 grams of the above norbornene terminated polyetherimide, 4.0 grams of 1,1,3,3-tetramethyldisiloxane and 50 ml of dry chlorobenzene. The solution was stirred and heated to 70° C. for about 12 hours. Carbon black was added to the resulting mixture at room temperature and the solution was stirred 30 minutes. The mixture was then filtered and the filtrate was poured into 200 ml of dry diethylether with vigorous stirring. There was obtained a precipitate which was filtered, washed with diethylether and dried. Based on method of preparation, the precipitate which was obtained at a 98% yield, was silicon hydride terminated polyetherimide having the formula,

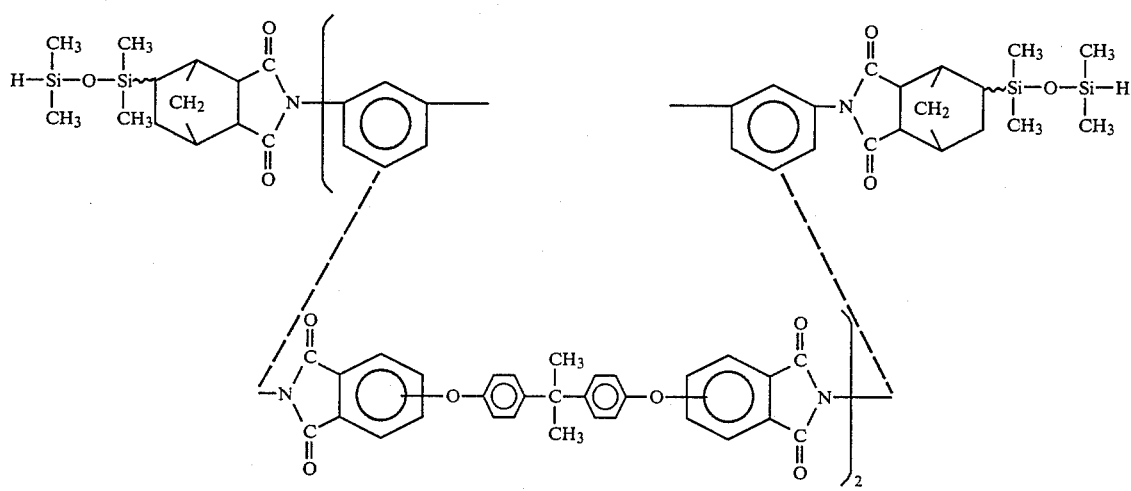

The identity of the product was further confirmed by NMR and IR analysis. There was added 1 drop of a 5% solution of the platinum catalyst shown in Karstedt, U.S. Pat. No. 3,775,442, under nitrogen to a mixture of 1.2 grams of the above silicon hydride terminated polyetherimide, 50 ml of chlorobenzene and 16 grams of a vinyl terminated polydimethylsiloxane having an average molecular weight of about 18,000. The resulting mixture was heated to 80° C. with stirring for about 8 hours. The resulting mixture was then filtered and there was obtained a gum-like residue having an intrinsic viscosity in chloroform of 0.44. Based on method of preparation, and its NMR spectrum, the product was a vinyl terminated polydimethylsiloxane polyimide block polymer having the formula,

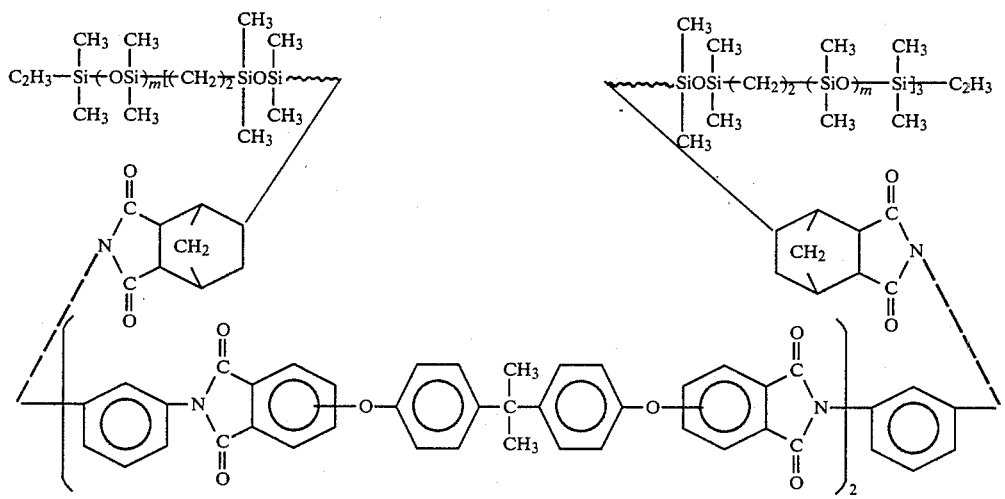

where m is previously defined.

A heat curable composition was prepared in accordance with the practice of the present invention by blending together 10 grams of the above vinyl terminated polydimethylsiloxane polyimide block copolymer, 0.7 gram of vinyl chain-stopped polydimethylsiloxane having a viscosity of 5000 centipoise at 25° C., 0.3 gram of a polydimethylsiloxane having about 3.5% by weight of methyl hydrogen siloxane units and 0.3 gram of dicumyl peroxide. The resulting mixture was degassed and heated at 150° C. for 18 hours in an oven. There was obtained a polydimethylsiloxane polyimide block polymer having improved toughness as compared to a similarly cured polydimethylsiloxane.

EXAMPLE 2

There was added 10 drops of a 5% platinum catalyst prepared in accordance with Karstedt. U.S. Pat. No. 3,775,442, assigned to the same assignee as the present invention, to a mixture while it was being stirred of 69.5 g (0.42 mole) of 5-norbornene-2,3-dicarboxylic acid anhydride, 26.8 g (0.2 mole) 1,1,3,3-tetramethyldisiloxane and 100 ml of dry chlorobenzene. The resulting mixture was heated with stirring to 70°-80° C. for 4 hours and then 100°-110° C. overnight. After cooling, carbon black was added and the solution was stirred for 30 minutes at room temperature. Filtration, removal of the solvent at 100° C. with a vacuum pump and addition of dry diethylether resulted in the precipitation of a white crystalline solid. Based on method of preparation, the product was 5,5'-(1,1,3,3-tetramethyl-1,1,3-disiloxanediyl)-bis-norbornane-2,3-dicarboxylic anhydride having the formula

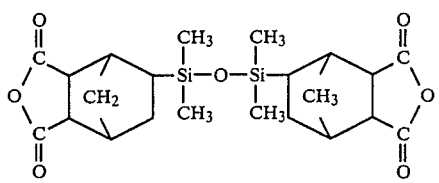

There is added 1 drop of 96% sulfuric acid to a mixture of 0.01 moles of the above dianhydride, 0.01 moles of 1,3,5,7-tetravinyl-1,3,5,7-tetramethylcyclotetrasiloxane and 0.05 moles of octamethylcyclotetrasiloxane in 50 ml of dry toluene. The resulting solution is refluxed for 2 hours. After cooling, carbon black is added and the solution is heated to 100° C. for 1 hour. Filtration and evaporation gives a colorless oil. Based on method of preparation, there is obtained a methylvinylpolysiloxane having terminal norbornane anhydride groups.

There is added to a solution of $5 \times 10^{-3}$ moles of methylene dianiline and 5 ml of dimethylformamide, while it is stirred under nitrogen, a mixture of $10^{-3}$ mole of the above norbornane anhydride methylvinylsiloxane, $4 \times 10^{-3}$ mole of benzophenone tetracarboxylic dianhydride, and 5 ml of dimethylformamide. The resulting mixture is stirred for 2 hours at 50° C. There is obtained a silicon-amide acid copolymer. The solution is then poured into a glass dish and dried at 80° C. for 1 hour and 150° C. for 2 hours in an oven cast and flowing nitrogen. Based on method of preparation, there is obtained a silicon-polyimide block copolymer having dimethylsiloxy units and methylvinylsiloxy units in the siloxane blocks.

A heat curable composition is made by milling the above silicon-polyimide block copolymer with 2% by weight of benzoyl peroxide. A test slab is press cured for 10 minutes at 400° F. and oven cured for 2 hours at 400° F. There is obtained a tough elastomeric silicon-polyimide block copolymer.

EXAMPLE 3

A solution was refluxed for 2 hours under nitrogen consisting of 19.62 grams of norbornene dicarboxylic acid monomethylester, 9.91 grams of methylene dianiline and 50 ml of dry methanol. After evaporation of the solvent, the residue was heated to 150° C. for 2 hours in an oven under nitrogen. There was obtained a white solid which was dissolved in dry methylene chloride and poured into 300 ml of methanol. The resulting white precipitate was collected, washed in methanol and dried to provide a yield of 25.7 grams of a bisimide.

A solution of 4.9 grams of the above bisimide, 15 grams of silicon hydride terminated polydimethylsiloxane having a molecular weight of about 1500, 30 ml of dry chlorobenzene and 5 drops of the platinum catalyst of Example 1, was heated to 80° C. with stirring for about 8 hours. A tough gum was obtained after carbon black had been added to the solution which was then filtered and heated to evaporate the solvent. There was obtained a block copolymer based on method of preparation and the complete disappearance of silicon hydride based on NMR and IR spectra. The block copolymer had the following formula,

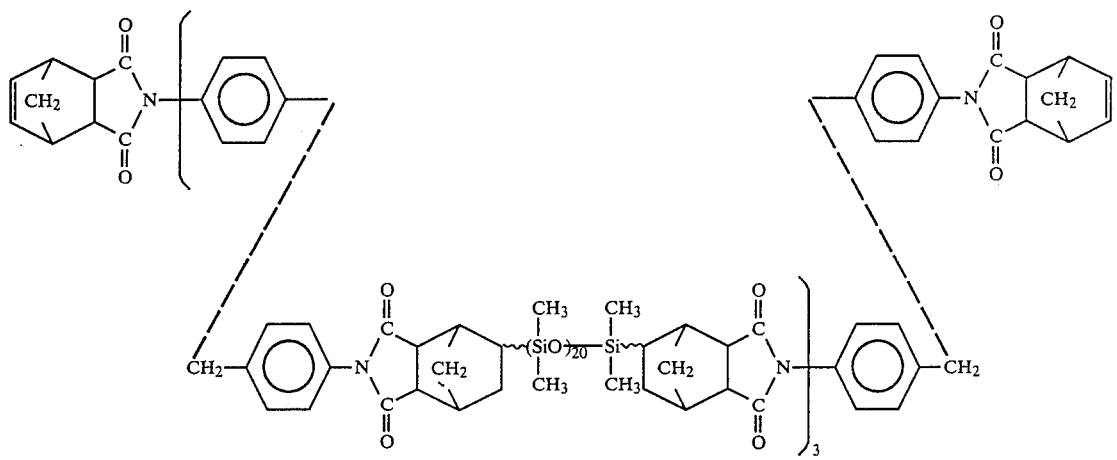

A heat curable siloxane imide composition was prepared by blending 10 grams of the above block copolymer, 0.7 grams of a vinyl containing polydimethylsiloxane having a viscosity of about 5000 centipoises, 0.3 gram of a polydimethylsiloxane having a molecular weight of about 30,000, and about 3.5% by weight of dimethyl hydrogen siloxy terminated units and 0.3 gram of dicumyl peroxide. After degassing, the resulting mixture was cured at 180° C. for about 12 hours in an oven. There was obtained a tough silicone polyimide elastomer having a satisfactory degree of elongation.

Although the above examples are directed to only a few of the very many variables which can be utilized for making the heat curable siloxane-imide compositions of the present invention, it should be understood that the present invention is directed to a much broader variety of polydiorganosiloxane-imide block copolymers which include formula (1) and formula (2) blocks or block copolymers obtained by using siloxane dianhydride as shown by formula (6) in combination with aryl diamines and organic dianhydrides as previously discussed. Methods for converting such heat curable compositions to products useful in a variety of applications such as aerodynamic seals and gaskets, and organopolysiloxane polyimide elastomers having superior heat age resistance are also contemplated.

What I claim as new and desire to secure by Letters Patent of the United States is:

1. Heat curable compositions comprising,
(A) an effective amount of an organic peroxide selected from the class consisting of benzoyl peroxide, dicumyl peroxide, 2,5-dimethyl-2,5-ditertiarybutylperoxyhexane, tertiary butylperbenzoate, bis(2,4-dichlorobenzoyl)peroxide, tertiary butyl peroxide and tertiarybutylperoxyisopropyl carbonate, and (B) a norbornane or norbornene block copolymer comprising chemically combined blocks of a member selected from
(i) polydiorganosiloxane and
(ii) a mixture of polydiorganosiloxane and polyimide where the organo radicals of the polydiorganosiloxane are selected from the class consisting of the same or different $C_{(1-13)}$ monovalent hydrocarbon radicals and substituted $C_{(1-13)}$ monovalent hydrocarbon radicals and where the norbornane or norbornene groups in the block copolymer are substituted with radicals selected from the class consisting of hydrogen and $C_{(1-8)}$ alkyl radials.

2. A cured elastomer made from the composition of claim 1.

3. A composition in accordance with claim 1 where the organic peroxide is benzoyl peroxide.

4. A composition in accordance with claim 1, where the block copolymer has polydiorganosiloxane blocks which consist essentially of dimethylsiloxy units and methylvinylsiloxane units.

5. A heat curable composition comprising
(A) an effective amount of an organic peroxide, and
(B) a polydiorganosiloxane-polyimide block copolymer comprising by weight from 1 to 99% of polyimide blocks of the formula,

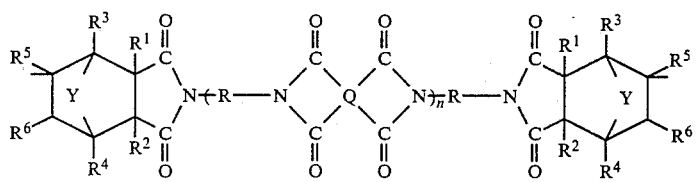

chemically combined with from 99 to 1% of polydiorganosiloxane blocks of the formula,

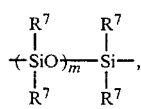

where R is a divalent $C_{(2-20)}$ organic radical selected from the class consisting of (a) aromatic hydrocarbon radicals having from 6-20 carbon atoms or halogenated derivatives thereof, (b) alkylene radicals or cycloalkylene radicals having from 2-20 carbon atoms (c) $C_{(2-13)}$ organo terminated polydiorganosiloxane, and (d) divalent radicals of the formula,

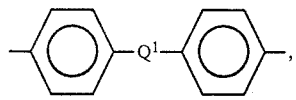

$Q^1$ is a member selected from the class consisting of

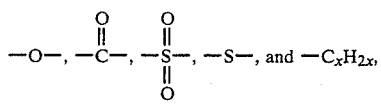

x is a whole number from 1 to 5 inclusive, Q is a tetravalent radical selected from

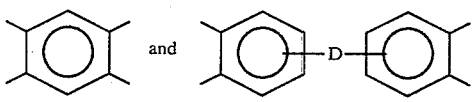

where D is a member selected from

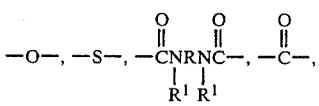

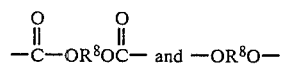

$R^8$ is a divalent radical selected from

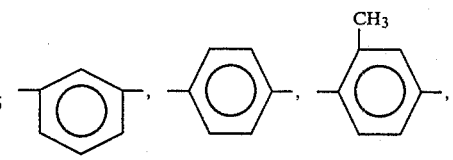

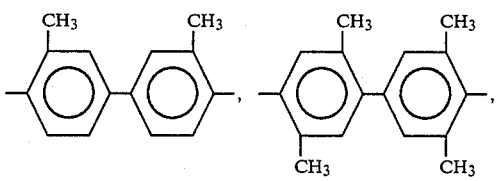

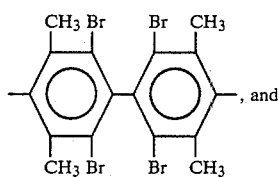

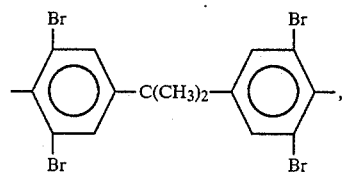

and divalent organic radicals of the general formula,

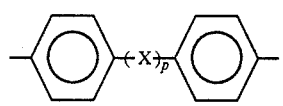

X is a member selected from the class consisting of divalent radicals of the formula,

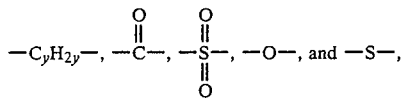

y is an integer from 1 to 5, $R^1$–$R^6$ are selected from hydrogen and $C_{(1-8)}$ alkyl radicals and $R^7$ is the same or different $C_{(1-13)}$ monovalent hydrocarbon radical and substituted $C_{(1-13)}$ monovalent hydrocarbon radical, Y is a divalent radical selected from —O— and —$C(R^1)_2$.

6. A heat curable composition in accordance with claim 5, where the organic peroxide is benzoyl peroxide.

7. A heat curable composition in accordance with claim 5, where the diorganosiloxane blocks of the polydiorganosiloxane-polyimide block copolymer consists essentially of chemically combined dimethylsiloxy units and methylvinylsiloxy units where there is 0.05 to 2 moles of methylvinylsiloxy units based on the total moles of diorganosiloxy units.

* * * * *